Figure 1:
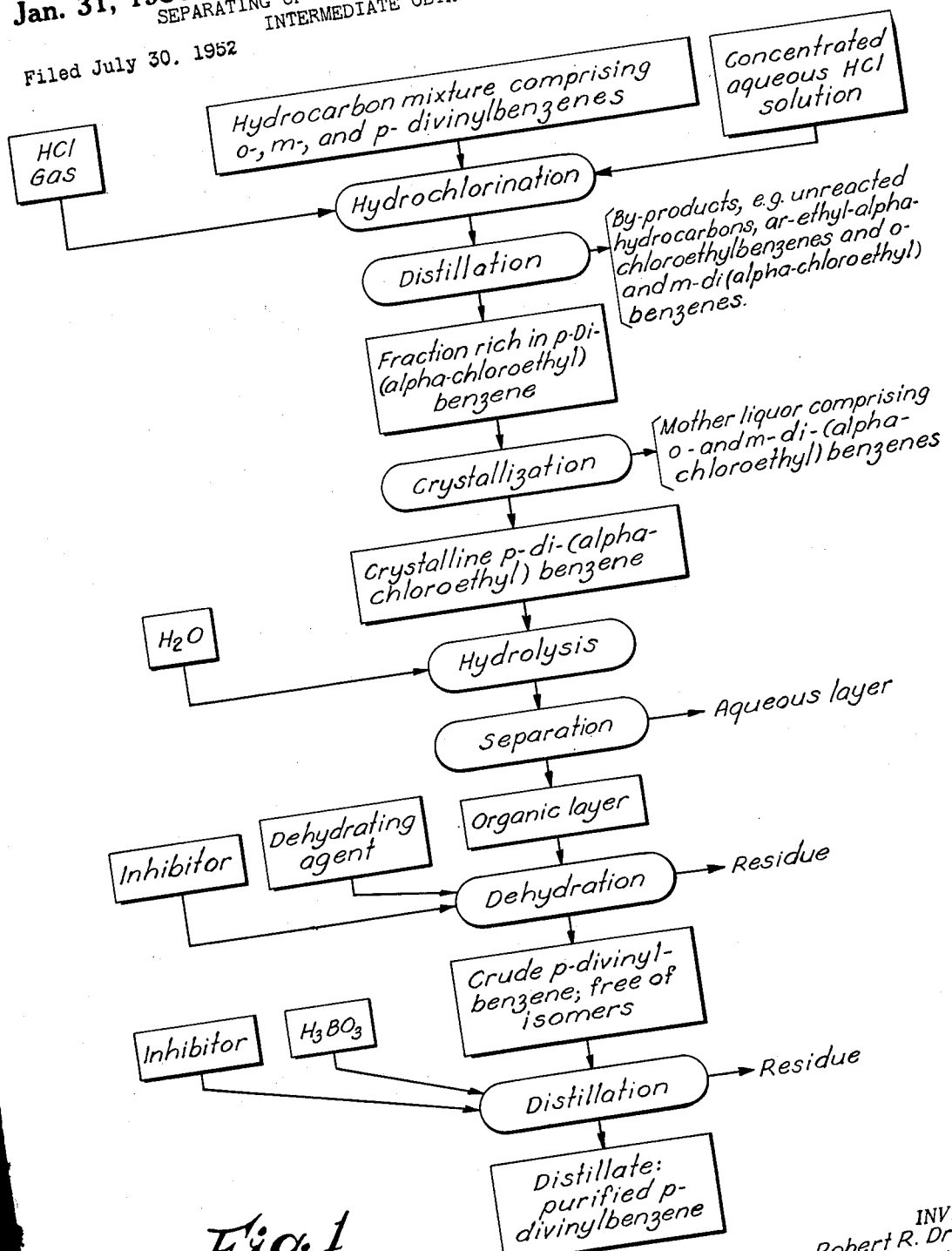

2,733,281
SEPARATING OF ISOMERIC DIVINYLBENZENES AND CHEMICAL INTERMEDIATE OBTAINED IN PROCESS

Robert R. Dreisbach and Robert A. Martin, Midland, Mich., assignors to The Dow Chemical Company, Midland, Mich., a corporation of Delaware Application July 30, 1952, Serial No. 301,784

5 Claims. (Cl. 260—669)

This invention concerns a method of separating para-divinylbenzene from hydrocarbon mixtures comprising the same and one or more of its isomers. It also pertains to a new compound, para-di-(alpha-chloroethyl) benzene, which is formed as an intermediate in the process.

Mixtures of isomeric divinylbenzenes together with varying proportions of the isomeric ar-ethylvinylbenzenes are manufactured by the thermal dehydrogenation of mixtures of isomeric diethylbenzenes formed by ethylating benzene in the presence of Friedel-Crafts catalysts. All three of the isomeric divinylbenzenes are usually present in such commercial products with the meta-isomer in greatest amount, the para-isomer in a somewhat smaller proportion, and the ortho-isomer in least amount. However, ways are known for varying the relative proportions of the isomeric divinylbenzenes, e. g. to obtain mixtures containing a major amount of the para-isomer together with lesser amounts of the ortho- and meta-isomers. The commercial mixtures usually contain from 10 to 40 weight per cent of the isomeric divinylbenzenes and from 60 to 90 per cent of ar-ethylvinylbenzenes. They are used in making benzene-insoluble copolymers, e. g. copolymers of styrene, ar-ethylvinylbenzene and divinylbenzene.

Although the above-mentioned mixtures of isomeric divinylbenzenes and isomeric ar-ethylvinylbenzenes are useful, e. g. in making polymeric materials, there are instances in which pure divinylbenzene, and particularly para-divinylbenzene, would be preferred. However, the isomeric divinylbenzenes and ar-ethylvinylbenzenes tend to distill together and to undergo polymerization when heated for the time and under the conditions required for careful fractionation. It is very difficult to obtain complete separation of the isomeric divinylbenzenes from the isomeric ar-ethylvinylbenzenes by fractional distillation. To the best of our knowledge, no method has heretofore been known for separating para-divinylbenzene from a mixture of the same and its isomers.

It is an object of this invention to provide a method whereby para-divinylbenzene may be separated from hydrocarbon mixtures comprising the same and either or both of its isomers. Another object is to provide a new compound, para-di-(alpha-chloroethyl) benzene, which is formed as a chemical intermediate in the process of the invention. Other objects will be evident from the following description of the invention.

We have found that hydrocarbon mixtures comprising para-divinylbenzene together with one or more of its isomers, e. g. mixtures of the isomeric divinylbenzenes, or of the latter with other aromatic hydrocarbons such as the isomeric ar-ethylvinylbenzenes, benzene, toluene, xylene, diethylbenzene, or ar-ethyltoluene, etc., may be reacted with hydrogen chloride under the conditions hereinafter described to convert the vinyl- or polyvinyl aromatic hydrocarbons to hydrogen chloride-addition compounds thereof, and that under such conditions the para-divinylbenzene reacts to form a new compound, para-di-(alpha-chloroethyl) benzene, which can be crystallized, or otherwise separated, from the mixture and be obtained in a form of high purity. We have further found that the para-di-(alpha-chloroethyl) benzene can be reconverted, e. g. by dehydrochlorination or by hydrolysis and dehydration of the hydrolysis product, into para-divinylbenzene and the latter be obtained in a form of good purity. However, the new crystalline compound, para-di-(alpha-chloroethyl) benzene, is also useful as an agent for the production of other valuable compounds, e. g. it can be reacted with phenolic compounds to obtain products having germicidal and fungicidal properties rendering them useful as agents for the treatment and preservation of paper, cellulosic textiles, and leather, etc. Accordingly, the para-di-(alpha-chloroethyl) benzene is, of itself, a valuable product obtained in the process of the invention.

We have further found that the separation, e. g. by distillation and/or crystallization, of the para-di-(alpha-chloroethyl) benzene from the aforementioned mixture of hydrogen chloride addition compounds leaves a mixture comprising one or more isomers thereof, such as ortho-di-(alpha-chloroethyl) benzene or meta-di-(alpha-chloroethyl) benzene, and that this residual mixture may be dehydrochlorinated, or hydrolyzed and the hydrolysis products be dehydrated, to obtain a product which is poorer in para-divinylbenzene than was the divinylbenzene-containing starting material and is correspondingly enriched in one or both of the isomers of para-divinylbenzene.

The reaction of hydrogen chloride with the hydrocarbon starting material comprising para-divinylbenzene and one or both of its isomers is carried out at tempeeratures between 0° and 30° C., advantageously between 10° and 20° C., using a concentrated, and preferably saturated, aqueous hydrochloric acid solution both as a reactant and a reaction medium. A minor amount of a polymerization inhibitor is preferably added to the reaction mixture to prevent, or curtail, polymerization of the vinyl aromatic compounds, particularly the divinylbenzene. A number of polymerization inhibitors effective for the purpose are known. The halonitrophenols disclosed in U. S. Patent No. 2,304,728 are especially effective. The are usually employed in amount corresponding to from 0.5 to 2 per cent of the weight of the hydrocarbons under treatment, but they can be used in smaller or larger proportions. The aqueous hydrochloric acid solution is usually employed in proportions corresponding to from 0.2 to 0.8 of the weight of the hydrocarbons to be admixed therewith, but it can be used in smaller or larger proportions, e. g. in as large amount as desired. During the reaction, gaseous hydrogen chloride is fed to the mixture so as to saturate, or nearly saturate, the aqueous phase with the same, e. g. so as to maintain as such phase an aqueous hydrochloric acid solution of about 30 weight per cent concentration or higher. Toward the end of the reaction, the concentration of the hydrochloric acid may, if desired, be permitted to decrease to values somewhat lower than that just given, but the hydrochloric acid phase of the mixture is preferably maintained in saturated, or nearly saturated, condition throughout the reaction. The mixture is stirred, or otherwise agitated, during the reaction. The reaction which takes place is exothermic and cooling is usually required to maintain the mixture at the above-mentioned reaction temperatures.

By carrying the reaction out under the preferred conditions just described, it occurs smoothly to form hydrogen chloride additives of the vinyl aromatic compounds present with little or no occurrence of side reactions. The addition compounds contain the chlorine atom in the alpha-position of the side chain, i. e. they are alpha-chloroethylbenzene compounds. Reaction temperatures above 30° C. are avoided since they often cause side reactions, such as dehydrochlorination of the chloroalkylaromatic products, or hydrolysis of such products, and polymerization, to occur to a considerable extent. At temperatures below 0° C., the reaction for the hydrochlorination of the vinyl aromatic compounds is sluggish, or fails to occur. However, at the preferred temperatures of from 10° to 20° C., the reaction takes place quite rapidly and in a satisfactory manner.

As hereinbefore indicated, the hydrocarbon starting material usually comprises a mixture of isomeric divinylbenzenes (including the para-isomer) and isomeric ar-ethylvinylbenzenes. In such instance, the crude product from the hydrochlorination reaction comprises corresponding chloroalkyl benzene compounds such as the isomeric ethyl-alpha-chloroethylbenzenes and isomeric di-(alpha-chloroethyl) benzenes. Such crude reacted mixture is usually fractionally distilled under vacuum to separate the ethyl-alpha-chloroethylbenzenes and other low boiling ingredients, if present, from the di-(alpha-chloroethyl) benzenes so as to concentrate the latter. Para-di-(alpha-chloroethyl) benzene is readily crystallized (and usually crystallizes of its own accord at room temperature) from the concentrated mixture of isomeric di-(alpha-chloroethyl) benzenes. It may also be concentrated, or separated, by fractionally distilling the mixture of isomeric di-(alpha-chloroethyl) benzenes. It is usually separated by a combination of these operations, the mixture of isomeric di-(alpha-chloroethyl) benzenes being first fractionally distilled to obtain a fraction enriched in the higher boiling para-isomer and the latter being crystallized from such fraction. The para-di-(alpha-chloroethyl) benzene is usually obtained in a form of 90 per cent purity or higher and, if necessary, may be further purified by recrystallization from organic solvents, e. g. acetone, carbon tetrachloride, or benzene, etc. It is a white crystalline compound boiling at approximately 98°–101° C. at 1 millimeter absolute pressure and having a melting point of approximately 93.8° C.

The para-di-(alpha-chloroethyl) benzene can be dehydrochlorinated, either directly or indirectly, to obtain para-divinylbenzene of good purity. The removal of hydrogen chloride from the para-di-(alpha-chloroethyl) benzene molecule to regenerate para-divinylbenzene is preferably accomplished indirectly by first hydrolyzing the para-di-(alpha-chloroethyl) benzene by heating the same together with water, e. g. at 90° to 100° C. or thereabout, separating the organic hydrolysis product (presumably para-di-(alpha-hydroxyethyl) benzene or a mixture of the same and a corresponding ether) and dehydrating it by heating it under vacuum together with a polymerization inhibitor and a dehydrating agent such as ammonium bisulfate, or potassium bisulfate, or a mixture thereof, to distil para-divinylbenzene therefrom as it is formed. Ways of carrying out such reactions for the direct, or indirect, removal of hydrogen chloride from the molecule of alpha-chloroethylbenzene compounds are well known in the art.

The para-divinylbenzene thus recovered is free or substantially free of its isomers, but often contains a minor amount of unreacted di-(alpha-hydroxyethyl) benzene or a partial dehydration product of the latter. It can be purified by treating the same with a polymerization inhibitor and with boric acid, or a mixture of boric oxide and water, in amount sufficient to react with the impurity and distilling the para-divinylbenzene from the boric acid esters thus formed.

After the aforementioned steps of reacting hydrogen chloride with a hydrocarbon mixture comprising isomeric divinylbenzenes and isomeric ar-ethylvinylbenzenes, distilling the product to separate therefrom a fraction of isomeric di-(alpha-chloroethyl) benzenes, and crystallizing para-di-(alpha-chloroethyl) benzene from said fraction, there remains, as the mother liquor from the crystallization, one or both isomers of para-di-(alpha-chloroethyl) benzene, i. e. ortho- or meta-di-(alpha-choloroethyl) benzene together usually with a minor amount of the para-isomer. This mother liquor can be dehydrochlorinated directly or indirectly, as described above, to regenerate the corresponding divinylbenzenes, whereby ortho- or meta-divinylbenzene, or a mixture of the two, is obtained in a form substantially free of ar-ethylvinylbenzene and containing para-divinylbenzene only in minor amount, if at all.

Figure 2:
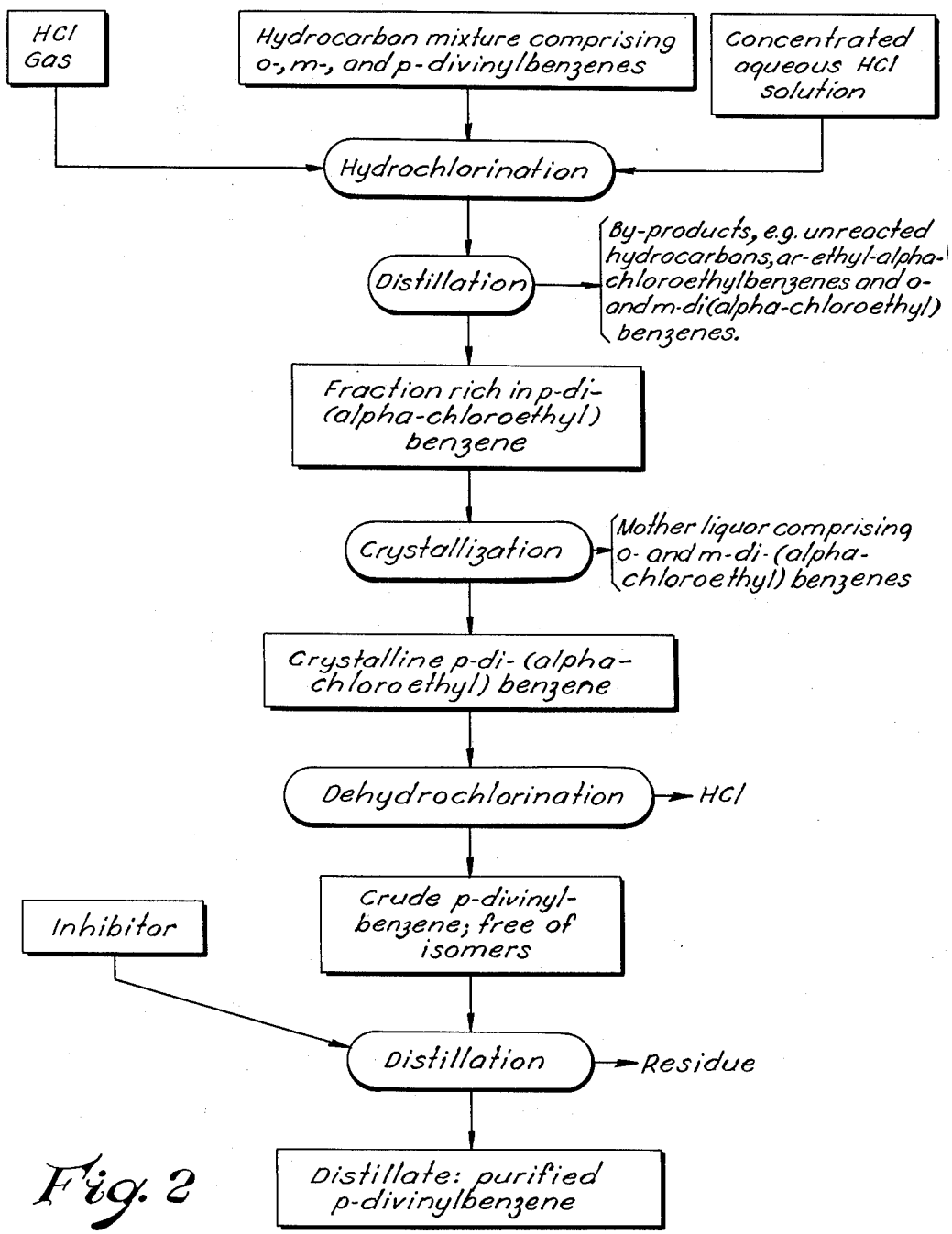

Figures 1 and 2 of the accompanying drawing are flow sheets illustrating the above-described two embodiments of the method of the invention. Fig. 1 illustrates the embodiment wherein the removal of equimolecular amounts of hydrogen and chlorine from the molecule of the para-di-(alpha-chloroethyl) benzene to regenerate the para-divinylbenzene is accomplished in indirect manner by hydrolyzing the para-di-(alpha-chloroethyl)benzene and dehydrating the organic hydrolysis product. Fig. 2 illustrates the embodiment wherein the para-divinylbenzene is regenerated by a direct dehydrochlorination of the para-di-(alpha-chloroethyl) benzene. Both of the flow sheets are self-explanatory and indicate the materials employed, or obtained, in various stages of the process.

The method, as just described, can be applied in obtaining pure para-divinylbenzene from a mixture of the same with either or both of its isomers or from more complex hydrocarbon mixtures comprising the isomeric divinylbenzenes together with ar-ethylvinylbenzenes. The hydrocarbon starting mixtures may also contain other aromatic hydrocarbons such as benzene, toluene, xylene, ethylbenzene, or diethylbenzene, etc. When the hydrocarbon starting mixture consists for the most part of para-divinylbenzene and one or both of its isomers, and contains little of any other hydrocarbons, it may be reacted with hydrogen chloride, as hereinbefore described, to obtain a product from which para-di-(alpha-chloroethyl) benzene may be crystallized directly without need for an intervening distillation step.

The following examples describe practice of the invention, but are not to be construed as limiting its scope.

*Example 1*

The hydrocarbon starting material employed in this example was a liquid mixture of approximately 49.1 weight per cent of divinylbenzene, 45.7 per cent of ar-ethylvinylbenzene and 5.2 per cent of diethylbenzene. It comprised all three of the isomeric divinylbenzenes and all three of the isomeric ar-ethylvinylbenzenes, but the meta-isomers were in smallest proportion. It was a fraction of the product resulting from the thermal dehydrogenation of a mixture of isomeric diethylbenzenes which had been formed by reacting ethylene with benzene in the presence of aluminum chloride and from which most of the meta-diethylbenzene had been removed. A mixture of 5424 grams of this hydrocarbon starting material and 2712 grams of concentrated, i. e. approximately 36 per cent, hydrochloric acid was stirred and cooled in an ice-bath for 35 hours, during which time gaseous hydrogen chloride was fed to the mixture to maintain the aqueous hydrochloric acid phase thereof in concentrated condition. During the reaction period just mentioned, the mixture was at temperatures of from 15° to 20° C. The reacted mixture settled into layers on standing. The organic layer was separated, dried over sodium carbonate and filtered. The filtrate was fractionally distilled under vacuum in the presence of a small amount of a basic anion exchange agent as a stabilizer for the chloroethylbenzene compounds. In the distillation there were collected 1015 grams of unreacted hydrocarbons, i. e. a mixture of diethylbenzene and unconsumed ar-ethylvinylbenzene and divinylbenzene, 2333 grams of ar-alpha-chloroethyl-ethylbenzene, and 3278 grams of crude di-(alpha-chloroethyl) benzene, leaving 778 grams of residue in the still. A 3015 gram portion of the crude di-(alpha-chloroethyl) benzene was redistilled under vacuum. In this distillation there were collected three fractions of material, weighing 738 grams, 535 grams and 122 grams, respectively, and all distilling within a temperature range of from 98° C. at 1 mm. absolute pressure to 88° C. at 0.5 mm. pressure, which temperatures correspond to a range of from about 295° to about 298° C. at atmospheric pressure. The first two of these fractions were liquid when first collected. They were combined and a portion thereof was analyzed and found to contain 34.42 per cent by weight of chlorine. The third of said fractions of distillate crystallized in the receiving flask. A considerable portion of the first two of said fractions crystallized on standing. The crystals were separated by filtration and combined with the crystalline third distillate fraction. The mother liquor from the crystallization was a liquid mixture of isomeric di-(alpha-chloroethyl) benzenes having a specific gravity of 1.16 at 25° C. A 120 gram portion of the crude crystalline product was recrystallized from acetone, whereby there was obtained 95 grams of purified para-di-(alpha-chloroethyl) benzene as a white crystalline compound melting at approximately 93.8° C.

*Example 2*

The procedure of Example 1 was repeated, except that larger quantities of the starting materials were employed and greater care was taken in determining the relative proportions of the products from the hydrochlorination reaction. After completing the hydrochlorination reaction, separating the organic layer of the reacted mixture and drying it, the dried material was fractionally distilled under vacuum. The first two fractions of distillate consisted of unreacted hydrocarbons, i. e. diethylbenzene, ar-ethylvinylbenzene and divinylbenzene. As the subsequent distillate fractions there were collected (3) 1033 grams of a liquid having a specific gravity of 1.068 at 25° C.; (4) 1078 grams of liquid of specific gravity 1.096 at 25° C.; (5) 701 grams of liquid having a specific gravity of 1.145 at 25° C.; (6) 646 grams of product which crystallized in the receiving flask; and (7) 687 grams of crystalline product. The fractions (3) and (4) consisted for the most part of ar-(alpha-chloroethyl) ethylbenzene, and fractions (5)–(7) consisted for the most part of the isomeric di-(alpha-chloroethyl) benzenes, fractions (6) and (7) being principally the para-isomer. The fractions (5)–(7) were combined and again fractionally distilled under vacuum. In this distillation there were obtained 234 grams of a liquid mixture of the isomeric di-(alpha-chloroethyl) benzenes and, as a subsequent fraction of distillate, 1730 grams of crystalline para-di-(alpha-chloroethyl) benzene.

*Example 3*

A mixture of 374 grams of crystalline para-di-(alpha-chloroethyl) benzene, 2000 grams of water and 0.5 gram of 2,4-dichloro-6-nitrophenol (a polymerization inhibitor) was boiled under reflux for 2½ hours. The mixture was then allowed to settle and the organic layer thereof was separated. An aliquot portion of the aqueous layer was titrated with a standard alkali solution to determine its content of hydrochloric acid. From the titration it was calculated that the hydrolysis of the para-di-(alpha-chloroethyl) benzene to form para-di-(alpha-hydroxyethyl) benzene was 91.5 per cent complete. The organic layer of the hydrolysis mixture weighed 291 grams. A 258 gram portion of the crude para-di-(alpha-hydroxyethyl) benzene was treated with 1 gram of 2,4-dichloro-6-nitrophenol and gradually added to 90 grams of ammonium bisulfate while heating the resulting mixture at temperatures of from 200° to 300° C. and at absolute pressures of from 10 to 40 mm. so as to distill para-divinylbenzene from the mixture as it was formed. During most of the reaction period, the mixture was at a pot temperature of about 215° C. and the distilling temperature was 105° C. The para-divinylbenzene which was collected as distillate had a specific gravity of 0.945 at 25° C. It was of 81.3 weight per cent purity. The impurity was para-di-(alpha-hydroxyethyl) benzene, or a partial dehydration product of the same, which had been swept from the reaction vessel together with the para-divinylbenzene. The para-divinylbenzene is freed of the impurity by heating the same, under vacuum and in the presence of a polymerization inhibitor, together with sufficient boric acid to react with the impurity so as to distill the para-divinylbenzene from the boric acid ester that is formed.

We claim:

1. A method which comprises forming a mixture of isomeric di-(alpha-chloroethyl) benzenes by passing hydrogen chloride into a mixture of a concentrated aqueous hydrochloric acid solution and a liquid hydrocarbon material comprising para-divinylbenzene and at least one of its isomers while agitating and maintaining the mixture at temperatures between 0° and 30° C., separating the normally crystalline compound, para-di-(alpha-chloroethyl) benzene, from the reacted mixture, and removing hydrogen chloride from the molecule of the para-di-(alpha-chloroethyl) benzene to regenerate para-divinylbenzene therefrom.

2. A method which comprises forming a mixture of isomeric di-(alpha-chloroethyl) benzenes by passing hydrogen chloride into a mixture of a concentrated aqueous hydrochloric acid solution and liquid hydrocarbons comprising para-divinylbenzene and at least one of its isomers while agitating and maintaining the mixture at reaction temperatures between 10° and 20° C., separating the normally crystalline compound, para-di-(alpha-chloroethyl) benzene, from the reacted mixture, hydrolyzing the para-di-(alpha-chloroethyl) benzene by heating the same at a reaction temperature together with water, and dehydrating the hydrolysis product to regenerate para-divinylbenzene therefrom.

3. A method, as claimed in claim 2, wherein the hydrocarbon starting material comprises para-divinylbenzene and at least one isomer thereof and a mixture of isomeric ar-ethylvinylbenzenes, and the products resulting from the hydrochlorination reaction are fractionally distilled to separate therefrom a mixture of isomeric di-(alpha-chloroethyl) benzenes, including the para-isomer.

4. A method, as claimed in claim 3, wherein para-di-(chloroethyl) benzene is crystallized from a mixture of the same and an isomer thereof, the crystals are separated, hydrolyzed by heating the same together with water and a polymerization inhibitor, the organic hydrolysis product is dehydrated by heating a mixture of the same, a polymerization inhibitor and a dehydrating agent selected from the group consisting of ammonium bisulfate and potassium bisulfate to a reaction temperature at subatmospheric pressure while distilling the para-divinylbenzene therefrom as it is formed, and the para-divinylbenzene is purified by admixing boric acid therewith and distilling the para-divinylbenzene from the mixture.

5. A method which comprises forming a mixture of isomeric di-(alpha-chloroethyl) benzenes by passing hydrogen chloride into a mixture of a concentrated aqueous hydrochloric acid solution and a liquid hydrocarbon material comprising para-divinylbenzene and at least one of its isomers while agitating the mixture and maintaining it at reaction temperatures between 10° and 20° C., and separating the crystalline compound, para-di-(alpha-chloroethyl) benzene, from the reaction products.

(References on following page)

References Cited in the file of this patent

UNITED STATES PATENTS

| | | |
|---|---|---|
| 1,998,538 | Finkelstein et al. | Apr. 23, 1935 |
| 2,231,026 | Quattlebaum et al. | Feb. 11, 1941 |
| 2,390,368 | Hochwalt | Dec. 4, 1945 |
| 2,507,506 | Dreisbach et al. | May 16, 1950 |

FOREIGN PATENTS

| | | |
|---|---|---|
| 155,294 | Japan | Mar. 4, 1943 |

(Abstracted in Chem. Abstracts 44, col. 3019 (1950).)

OTHER REFERENCES

Ruggli et al.: Chem. Abstracts, 36, col. 1037–8 (1942) (1 page).